Figure 1:
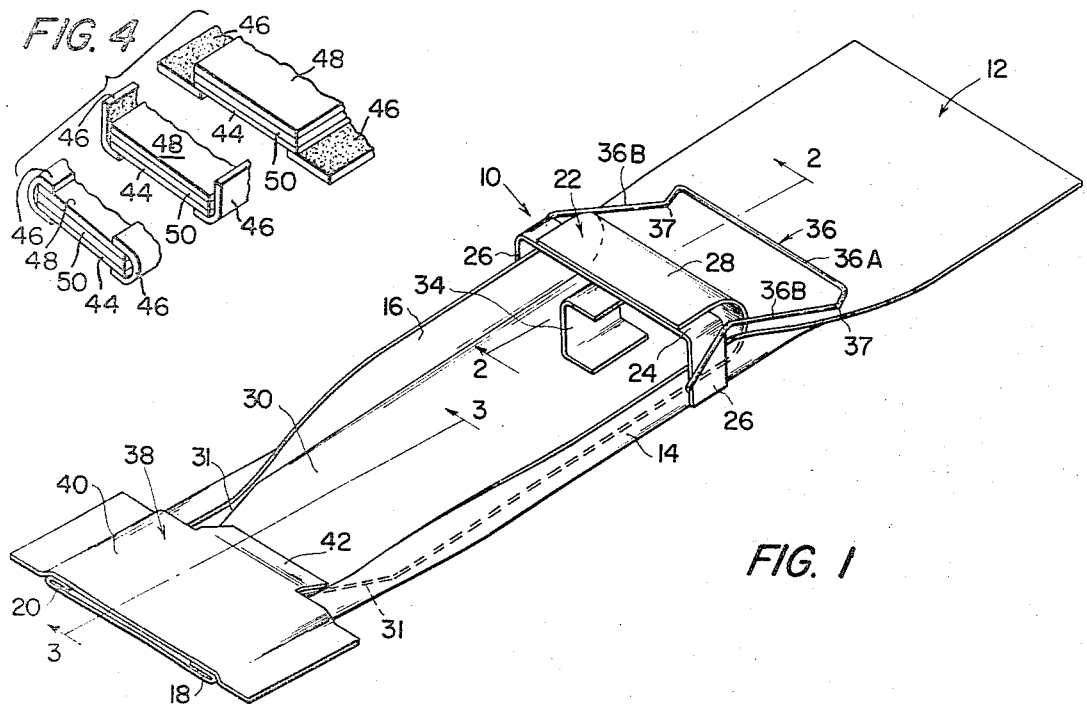

April 11, 1967

C. P. COVINO 3,313,672

APPARATUS FOR FORMING A SINGLE MULTI-LAYERED STRIP OF
MATERIAL FROM PLURAL STRIPS

Filed Nov. 1, 1965

INVENTOR.
CHARLES P. COVINO

BY *Jerome Bauer*

ATTORNEY.

United States Patent Office 3,313,672
Patented Apr. 11, 1967

3,313,672
APPARATUS FOR FORMING A SINGLE MULTI-LAYERED STRIP OF MATERIAL FROM PLURAL STRIPS
Charles P. Covino, Upper Montclair, N.J., assignor to General Magnaplate Corporation, Belleville, N.J., a corporation of New Jersey
Filed Nov. 1, 1965, Ser. No. 505,941
10 Claims. (Cl. 156—467)

This invention relates to a material guiding and sealing device for forming a single multi-layered strip of material from a plurality of individual continuous strips of material and which is well adapted to be received within the housing described in copending application entitled "Method and Means for Dispensing a Plurality of Materials in Conforming Relationship to a Work-piece Surface," Ser. No. 177,899, filed Mar. 6, 1962.

This invention has particular application to the art of radiography wherein it is important to apply a light sensitive film to a surface to be radiographed. In such cases, it is necessary that the film be enclosed in a film holder and that both the film holder and the film conform in close surface fitting engagement with the surface to be radiographed. In the past, it has been the practice to enclose pieces of film in individual casettes. Then, by making a series of time consuming individual overlapping exposures, it was finally possible to piece together a costly composite radiographic picture of the surface.

A solution to this problem has been the provision of a housing having rolls of continuous film and film holding strips therein, as described more fully in the above-noted copending application. One of the film holding strips has sealing means extending along its length. Accordingly, as the strips are dispensed from the housing, as by being withdrawn therefrom by an external force, the strips are guided into a preselected path and are sealed together to form a multi-layer film package. However, if the withdrawing force is too large, sudden, or applied in an uneven manner the rolls unwind at much greater rate than the rate at which they are dispensed. Accordingly, the sealing means may adhere to interior portions of the housing or other elements contained therewithin, thereby causing the apparatus to jam. Thus, a continued withdrawing force applied to the strips thereafter, will result in the strips being ripped or otherwise separated from the respective rolls.

The desideratum of this invention is to provide a device that will guide and seal together continuous film and film holding strips, each from separate rolls without jamming, thereby to provide a single multi-layer film package.

Another object of this invention is to provide a device that automatically positions discrete lengths of individual materials into a desired overlying engaging relationship and joins them together into a single strip of multi-layer material enabling the same to be dispensed as such without damage.

A further object of this invention is to provide a device of the type described that prevents undue unrolling of the rolls of film holding strip of material having the sealing means connected thereto to eliminate jamming of the dispensing apparatus.

Figure 2:
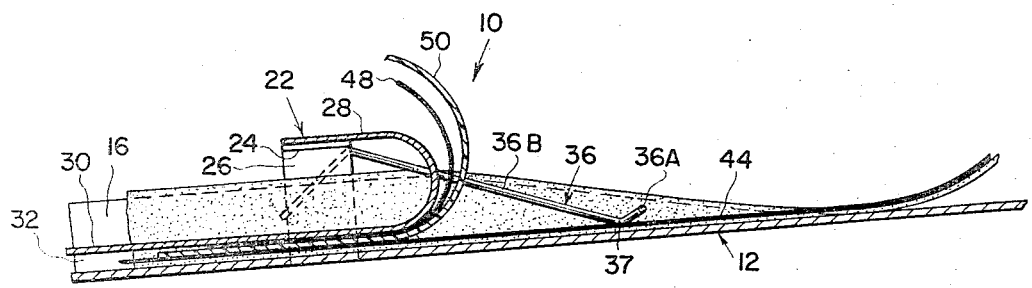
Figure 3:
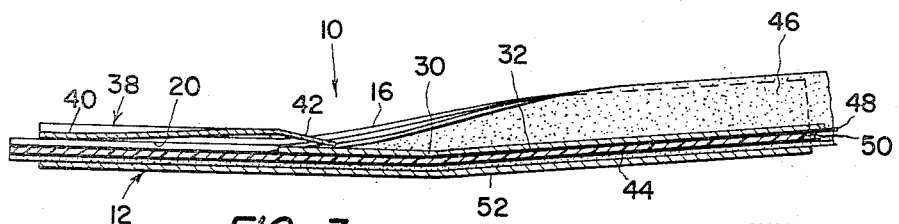

Other and further objects of this invention reside in the structures and arrangements hereinafter more fully described with reference to the accompanying drawing in which:

FIG. 1 is a perspective view of a device constructed according to the invention, FIG. 2 is a sectional view of the device of the present invention taken along line 2—2 in FIG. 1, illustrating a plurality of strips of material being guided into overlying arrangement, FIG. 3 is a vertical sectional view of the front section of the device shown in FIG. 1, illustrating the formation of a single multi-layered strip of material from a plurality of strips, and FIG. 4 is a fragmentary view of the relationship of the strips of material as they move in stages from right to left through the device of FIG. 1.

As noted above, the device of the present invention is adapted to be used in conjunction with the dispensing apparatus illustrated and described in the aforenoted copending application. Thus, the device of the invention is designated generally by the numeral 10 in FIG. 1 and includes a substantially planar, base 12 that is adapted to rest on a support surface. For purposes of identification. the left-hand end of the base 12, as taken in FIG. 1, will be referred to as the front or forward end of the device 10 while the right-hand end of the base 12, as taken in FIG. 1, will be referred to as the rear end of the device 10. Marginal longitudinal walls 14 and 16 of the base 12 gradually curve upwardly forwardly from a point spaced from the rear of the base so that a portion of each of the walls 14 and 16 is substantially perpendicular to the plane of the base 12. Additionally, the portions of the walls 14 and 16 gradually curl over the base 12 in superposed spaced relation thereto as they approach the forward end to define opposed open-ended and open-sided slots 18 and 20, having wide mouths at the entrance thereof and relatively small mouths at the exits thereof.

Mounted on base 12 is a material guide structure generally identified by the numeral 22. The material guide structure 22 extends transversely across the width of the base 12 in the nature of a bridge having a top portion 24 that is bent vertically downward at its sides 26 for connection with the perpendicular portions of the marginal walls 14 and 16 to support the top 24 above the upper surface of the base 12. Connected to the top portion 24 of the bridge is a downwardly and rearwardly extending guide member 28 that is substantially convexly shaped as viewed from the rear of the device 10. The member 28 terminates in an elongated longitudinally forwardly extending presser leg 30 that terminates at a point spaced from the front of the base 12 (FIG. 3). The side edges of the leg 30 taper transversely inwardly toward each other at 31 (FIG. 1) forwardly from a point adjacent to the beginning of the slots 18 and 20 so that the forward end of the leg 30 has a smaller width than the rear portion thereof. The leg 30 is in spaced relation to the base 12 to define a material receiving slot 32 therebetween. A bracket or channel 34 is connected between the top portion 24 of the bridge and the leg 30 and maintains the leg 30 a predetermined distance above the base 12.

Connected to the sides 26 of the bridge 22 and extending rearwardly and downwardly therefrom is a substantially resilient U-shaped force exerting brake or bail wire 36. The wire 36 has a body 36A that is raised or spaced from the base 12 by side arms 36B that are bent at force applying elbows 37. The ends of the arms are directed upward from the elbows and are immovably secured to the sides 26 of the bridge 22. The side arms 36B are so directed as to resiliently urge their force applying elbows 37 into frictionally engagement with the base 12. The elbows 37 are transversely spaced from each other inward from the edges of the base 12.

Positioned adjacent to the forward end of the base 12 is a biasing member designated generally by the numeral 38. The member 38 has a top plate 40 that extends transversely beyond the edges of the base 12 and is connected to the top curled surface of each of the marginal walls 14 and 16. The top plate 40 includes a rearwardly and downwardly sloping lateral extension 42 that bears against the leg 30 adjcent to the end thereof, and which urges the plate 30 towards and into contact with the facing surface of the base 12.

As noted in the copending application referred to above, the device 10 is to be used in conjunction with a rolled strip of film holder sheet 44. As described in the copending application, the sheet 44 includes adhesive tape means 46 that extend beyond and above the longitudinal edges for the entire length thereof. The adhesive tape means 46 are adapted to engage with lengths of a film holder sheet 48 to form a complete light-tight film holder for the enclosure of a strip of film 50 therebetween.

In operation, an end portion of the strip of film holder sheet 44 is fed from the roll (not shown) toward the upper surface of the base 12 and threaded beneath the bail wire 36. The wire 36 bears against the upper or adjacent surface of the sheet 44 and maintains the portion of the sheet 44 between the elbows 37 of the bail wire in flat engagement with the base 12 therebeneath, the frictional forces exerted by the elbows 37 of the arms 36B of the bail 36 against the sheet 44 forcing it into surface frictional engagement with the adjacent surface of the base 12 limiting the free movement of the sheet 44 through the device 10. Accordingly, by acting essentially as a friction brake, even if a large sudden withdrawing force is applied to the sheet 44, the drag exerted by the bail wire 36 on the sheet due to the aforenoted frictional engagement, will prevent undue unrolling and backlash of the roll of the sheet 44. Consequently, since unwanted excessive unrolling or backlash is obviated, the possibility of the adhesive tape or sealing means 46 adhering to a surface of the interior portion of the housing or other elements contained therewithin is similarly obviated.

Thereafter the end of a length of a rolled strip (not shown) of film holder sheet 48 is unrolled downward toward the base 12. However, this sheet 48 is placed in overlying relationship with the first film holder sheet 44 by threading it between the arms 36B, the body 36A, about the curved guide 28 and between the base 12 and presser leg 30.

Subsequently, the end portion of the strip of film 50 is unrolled from its roll (not shown) toward the base 12. It too is threaded as the sheet 48 described above as it is positioned in surface engaging relationship between the two film holder sheets 44 and 48, as shown by the right-hand illustration in FIG. 4. In this manner the path of movement of the film 50 and the film holder sheets 44 and 48 is from the rear to the front end of the device 10. Each of the three strips of material 44, 48 and 50 are then moved forward through the device between the presser leg 30 and base 12. Because the adhesive tape means 46 are of flexible construction, as the strips of material move through the slot 32, the adhesive tape means 46 on the sheet 44 are progressively displaced upward or moved from their substantially horizontal planar position into an upright position conforming to the position of the perpendicular portion of the marginal edges 14 and 16, as shown in FIG. 2 and the intermediate illustration in FIG. 4.

As the strips of material are fed through the slot 32, the leg 30 applies a resilient downward force against the adjacent surface of the strip of film holder sheet 48 causing the same to move into close surface engagement with the strip of film 50 therebeneath and, in like manner, forcing or moving the latter into tight surface engagement with the next adjacent surface of the strip of film holder sheet 44. Thus, the presser leg 30 places the film 50 and the two film holder sheets 44 and 48 into tight engaging overlying relationships while the gradually curled portions of the marginal walls 14 and 16 causes the adhesive tape means 46 of the film holder sheet to follow their shape so that the same will gradually bend upright.

Continued feeding movement of the three engaged overlying strips of material 44, 48 and 50 toward the front end of the device 10 causes the adhesive means 46 to follow the curved marginal walls 14 and 16 and to direct the adhesive tape means 46 downwardly gradually as the sheets move through the forward section of the device 10 after entering at the enlarged mouth of the slots 18 and 20 and exiting at the narrow mouth thereof. Thus, the adhesive tape means 46 are rolled downward and over and into surface engagement with the top strip of film holder sheet 48. The tapering side edges of the leg 30 provide clearance between the slots 18 and 20 and the leg 30 to allow the adhesive tape means 46 to engage the sheet 48. In actual practice, the adhesive tape means 46 are strips of opaque tape; however, any other form of adhesive means may be utilized.

As the adhesive tape means 46 are rolled and folded over the outer surface of the film holder sheet 48, they adhere to the same. The extension 42 urges the sheets 44, 48 and 50 into tighter engagement and the spacing between the portions of the marginal walls 14 and 16 and the base 12 defining the respective slots 18 and 20 is such that the adhesive tape means 46 are pressed into even tighter engagement as the strips move beneath the plate 40. The result is a single light-tight multi-layered strip comprised of two strips of film holder sheets 44 and 48, as shown by the left hand illustration in FIG. 4, which are connected together along their longitudinal edges by the adhesive tape means 46. The film 50 is contained between the film holder sheets and moves with the same as the film holder is dispensed from the device 10.

As shown in FIG. 3, the forward portion of the base 12 is inclined slightly upwardly at 52. In consequence, when the materials are moved forwardly through the device 10, a slight frictional resistance created by the unrolling of the materials 48 and 50 is sufficient to apply a lifting or moving force to the leg 30 of the structure 22 causing the same to lift about the fulcrum created adjacent to the forward end of the base 12. By applying a lifting or moving force to the guide means 22, the base 12, connected to the guide structure 22, is also lifted. Since the sheet 44 is dispensed from a roll (not shown) the base 12 will be lifted toward substantial coincidence with the tangential path of movement of the film holder sheet 44. Thus, the materials will remain flat on the base 12 albeit the roll dispensing the sheet 44 is farthest from the structure 22.

Accordingly, a device has been provided for forming a plurality of sheets of material into a single multi-layer sheet of material that is simple in construction and is easy to operate and which prevents jamming of the dispensing apparatus.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:
1. A device for forming a single multi-layered strip of material from a plurality of strips of material moving therethrough comprising a base,
    first and second guide means,
    said first guide means being mounted on said base,
    said second guide means longitudinally extending from said first guide means in spaced relation to said base to define an elongated slot therebetween for receiving and guiding a plurality of strips to form the same into a single multi-layer strip of material,
    and third guide means on said base exerting a force on said second guide means to bias said second guide means toward said base to maintain adjacent ones of a plurality of strips of material in surface-to-surface engagement.

2. A device as in claim 1, and frictional engaging means on said base adapted to frictionally engage and limit movement of a strip of material through said slot.

3. In a device for forming a plurality of individual strips of material moving therethrough into a single multi-layered strip of material wherein the bottommost one of the plurality of strips of material is provided with adhesive tape means which adhere to the bottommost strip and extend beyond its longitudinal edges, a base, guide means on said base adapted for receiving and for guiding a plurality of strips of material into a single multi-layered strip of material, said guide means including a leg extending in spaced relation to the base to define a slot therebetween adapted to receive a plurality of strips of material, the side edges of said leg tapering forwardly inwardly from a point adjacent to the front end of said slot and adapted to provide a clearance for the adhesion of adhesive tape means to the uppermost of a plurality of strips of material.

4. A device as defined in claim 3, wherein said guide means is provided with a rear convexly curved surface adapted to facilitate entry of a plurality of strips of material into the slot defined by said leg.

5. A device as defined in claim 3, including biasing means mounted on said base and bearing against the upper surface of said leg on the tapered portion thereof adapted to maintain adjacent ones of a plurality of strips of material in surface-to-surface contact.

6. A device as defined in claim 5, and wire means mounted on said base and extending rearwardly from said guide means, a portion of said wire means being adapted to frictionally engage the upper surface of the bottommost one of a plurality of strips of material to limit the rate of movement of the bottommost strip through said device.

7. In a device for forming a plurality of individual strips of material moving therethrough into a single multi-layered strip of material wherein the bottommost one of a plurality of strips of materials is provided with adhesive tape means extending beyond its longitudinal edges; a base; a guide means on said base adapted for receiving and for guiding a plurlity of strips of material into a single multi-layered strip of material; said base being provided with mariginal longitudinal walls which curve upwardly and over said base to define opposed, open-ended, open-sided slots; said guide means including a leg extending in spaced relation to the base to define a slot therebetween adapted to receive a plurality of strips of material; the side edges of said leg tapering forwardly inwardly from a point adjacent to the front end of said slot to provide a clearance for the adhesion of adhesive tape means to the uppermost of a plurality of strips of material.

8. A device as defined in claim 7, wherein said guide means is provided with a rear convexly curved surface adapted to facilitate entry of a plurality of strips of material into the slot defined by said leg.

9. A device as defined in claim 7 including biasing means mounted on said base and bearing against the upper surface of said leg on the tapered portion thereof adapted to maintain adjacent ones of a plurality of strips of material in surface-to-surface contact.

10. A device as defined in claim 9 and wire means mounted on said base and extending rearwardly from said guide means, a portion of said wire means being adapted to frictionally engage the upper surface of the bottommost one of a plurality of strips of material to limit the rate of movement of the bottommost strip through said device.

References Cited by the Examiner
UNITED STATES PATENTS

| | | | |
|---|---|---|---|
| 368,166 | 8/1887 | Plamondon et al. | 156—467 |
| 1,305,141 | 5/1919 | MacPherson | 156—467 |
| 2,107,603 | 2/1938 | Ellenburg | 242—55.3 |
| 2,154,440 | 4/1939 | Crotts | 242—55.3 |
| 2,283,137 | 5/1942 | Fine | 156—467 X |
| 2,307,406 | 1/1943 | Howard | 156—199 |
| 3,037,717 | 6/1962 | Thomasma et al. | 242—55.3 |

EARL M. BERGERT, *Primary Examiner.*

P. DIER, *Assistant Examiner.*